Feb. 16, 1965     M. GEIGER     3,169,705
DEVICES FOR THE CONTINUOUS EMISSION OF ACTIVE SUBSTANCES
Filed Dec. 21, 1961
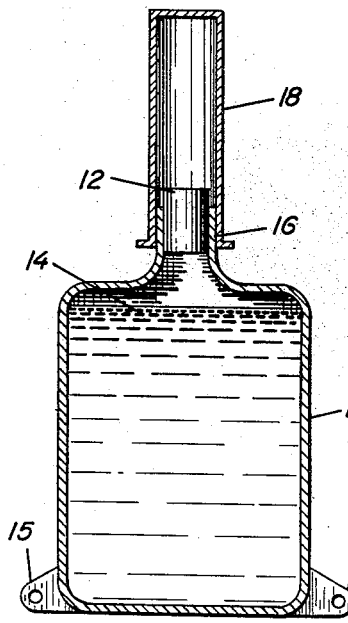
Fig. 1
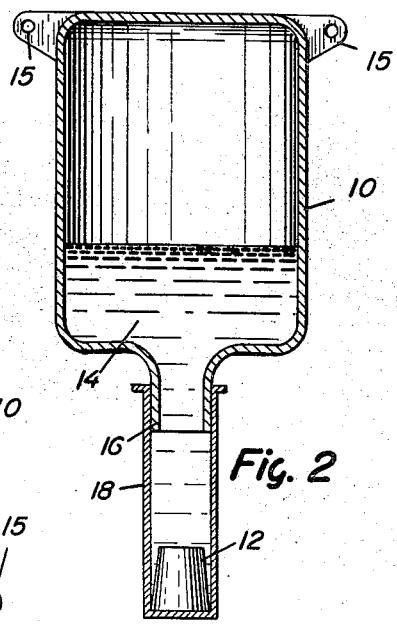
Fig. 2
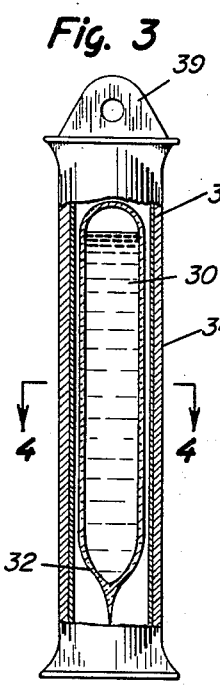
Fig. 3
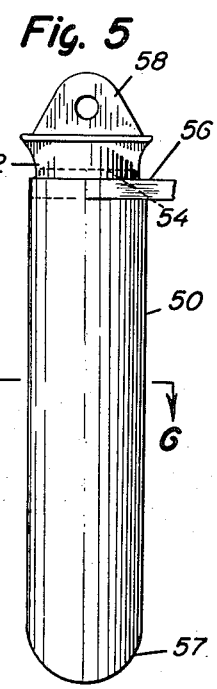
Fig. 5
Fig. 4
Fig. 6
INVENTOR
Max Geiger
by Harry Goldsmith
Attorney 3,169,705
DEVICES FOR THE CONTINUOUS EMISSION
OF ACTIVE SUBSTANCES
Max Geiger, Riehen, Switzerland, assignor to Ciba Limited, Basel, Switzerland, a company of Switzerland
Filed Dec. 21, 1961, Ser. No. 161,023
Claims priority, application Switzerland, Dec. 29, 1960, 14,556/60; June 29, 1961, 7,684/61
2 Claims. (Cl. 239—43)

This invention relates to a device for the continuous emission of biologically active substances over a prolonged period.

When biologically active substances, such as biocides, for example insecticides, are used, emission into a surrounding medium, for example air or water, is in many cases desirable in such a manner that as constant a concentration as possible of the active substances prevails in this medium. It is often necessary to keep this concentration within narrow limits thus requiring as steady an emission as possible of the active substance, since the toxicity of the active substance may require an upper limit to be placed on its concentration, and furthermore, the efficiency which can be achieved with a certain amount of active substance is greater if it is applied in a uniform concentration.

If the application of active substances is to be effected by emission into the surrounding air, this can be done either by spraying, for example as an aerosol, or by evaporation. With an aerosol, there is at first, after the spraying, a maximum concentration of the active substance in the atmosphere of the space or room treated, this concentration being rapidly reduced by escape from openings, for example doors or windows of the room, and by the deposition of aerosol particles on the walls. In many cases the active substance is destroyed after a short time by contact with building materials, which are generally alkaline, so that active substance deposited on the wall becomes ineffective. To maintain as uniform a distribution as possible in the atmosphere, this method of application requires a periodically repeated spraying operation which can be carried out either manually or automatically and, accordingly, requires staff or a complicated and correspondingly costly time switch.

If the active substance is evaporated in known manner, for example by means of a wick, a long-lasting and even concentration of the active substance in the room or space to be treated can only be maintained with difficulty, since the evaporation is largely dependent upon atmospheric conditions such as temperature. Furthermore, many active substances are destroyed on prolonged contact with air, for example by atmospheric oxygen or moisture, so that it is necessary to protect the active substance from contact with the atmosphere during storage. Moreover, having regard to the toxicity of the majority of active substances, the active substance must be prevented from emission in a dangerous dosage at the place of application. These requirements are not complied with by the known evaporation methods.

The present invention provides a device for the continuous emission of biologically active substances more particularly of biocides, said device including a storage container for confining liquid containing said active substance and a membrane through which the said substance can diffuse for final evaporation the membrane being so associated with the container that in use the interior surface of the membrane is in contact with the liquid containing the active substance confined by the container.

The device according to the invention has the advantage that it is possible by means thereof to supply a constant amount of active substance to the room or space to be treated even where there are variations in the atmospheric conditions. It is also particularly suitable for the prolonged and steady emission of insecticidal organic phosphorus compounds, for example dimethyldichlorovinyl phosphate.

By means of the device according to the invention, active substance may be given off to a space filled with air, by evaporation of the active substance which has passed through the diffusion wall. The active substance may also be given off to a liquid, for example to water in lakes and rivers. In this case, dissolution of the active substance which has issued in the surrounding liquid occurs at the outer surface of the diffusion wall.

According to a further feature of the invention, in order to ensure steady emission of the active substance over long periods of time, an excess of active substance is maintained on the inside of the membrane. Thus, while the container is being used, active substance is always present on the inside of the diffusion surface.

The container may be subdivided, a storage chamber containing the stock of active substance but being in communication with a chamber in which the active substance comes into contact with the membrane. The result is thus achieved that the supply of active substance on the inside of the membrane is largely independent of the size of the stock of active substance and also remains practically unchanged during use when there is a slow decrease in the stock of active substance. In this way, the desired prolonged emission of the active substance in constant or at least approximately constant amounts is obtained.

The bathing of the inside of the membrane by a sufficiently large supply of active substance may also be effected by utilizing a capillary action, for example in that a wick has one end immersed in the stock of active substance, while the other end of the wick is in contact with the inner surface of the membrane and wets it with active substance.

The outside of the membrane can also serve at the same time as an evaporation surface for the active substance. Advantageously, the diffusion resistance of the membrane is so calculated that the rate of evaporation of the active substance on the outer surface thereof exceeds the rate of diffusion of the active substance through it, so that active substance does not appear in liquid form on the outside. If such an adjustment between the diffusion resistance and the evaporation area is not possible, an additional evaporation surface can be provided.

The container may be so designed that it can be employed as a transport and storage container for the active substance before it is used as a device delivering the same. In this case, the membrane is prevented from coming into action during the storage and transport. This can be achieved either by preventing the active substance from coming into contact with the membrane while stored or by enclosing the membrane in a layer or film impermeable to the active substance, so that it does not come into contact with the atmosphere.

Further details of the invention will be described hereinafter and discussed with reference to the embodiments illustrated in the accompanying drawings, in which:

FIG. 1 is a sectional elevation of a device according to the invention in the condition and position suitable for storage, FIG. 2 is a similar view in the condition and position during use, FIG. 3 is a part section and FIG. 5 is an elevation and FIGS. 4 and 6 are sections of two further embodiments of such containers.

Referring to the drawings, in FIGS. 1 and 2 the container consists of a relatively large bottle-like supply vessel 10 filled with active substance 14 and the neck 16 of which is closed by a stopper 12. Over the neck 16 of the supply vessel 10 there is drawn a tubular diffusion candle 18 consisting of a material through which the active substance 14 can diffuse. Thus, for example, in a container employed for the application of DDVP (dimethyldichlorovinyl phosphate), the diffusion candle consists of polyvinyl chloride.

FIG. 1 shows the container in storage position. There is no diffusion through the membrane because the level of the liquid active substance is below the membrane and the active substance thus is not in contact with the membrane.

When the device is to be put into operation, the stopper 12 must be removed from the neck 16 of the supply container. This can be done by working from outside, for example in the case of a supply container consisting of impermeable plastic material e.g. polyethylene, by simply squeezing the sides of the container 10 together, so that the stopper 12 is expelled upwardly. The container can be suspended in the inverted position by means of eyes 15, so that the active substance can run into the interior of the diffusion candle, whence it diffuses through the wall and evaporates on the outer surface of the candle. As shown in FIG. 2 the major part of the active substance has been consumed, but the candle is still full. So long as this is the case, the velocity of diffusion remains substantially constant, so that a constant delivery of active substance can be ensured over long periods of time.

The storage portion, i.e. container 10, consists of material which is impermeable to the active substance. When the latter is an insecticidal organic phosphorus compound, e.g. dimethyldichlorovinyl phosphate, it is of advantage to use polyethylene.

The container and candle can in some cases be made of the same material but in different thicknesses, that of the storage container being so chosen that practically no active substance leaves the stoppered container, and that of the diffusion member being such as to allow the passage of the desired quantity of active substance. In this case the container 10 of FIG. 1 consists of material, e.g. polyethylene, having a wall thickness sufficient to prevent the passage of active substance. The wall of tube 18 of the same material must be thin enough to permit diffusion of the active substance. If in the above-mentioned case of the use of DDVP as active substance, the container and candle are to consist of the same material, for instance polyethylene, a very thin foil must be used for the candle. In order to give the latter the mechanical strength necessary for practical use, it can be reinforced by a supporting structure consisting of a material having good permeability to the active substance, for example paper or fabric.

It is also possible for example to locate the storage container inside the diffusion candle and to make it of material which is frangible without rupture of the candle.

Such an arrangement is shown in FIGS. 3 and 4. A glass ampoule 32 filled with active substance 30 serves as the storage container. Said ampoule is arranged within a closed tubular candle 34. The candle 34 is pinched together at both ends and heat sealed. When the active substance is to be used the internally located ampoule is destroyed from the outside by impact or pressure. The active substance 30 contained in the ampoule then fills the candle 34. In use, as before, the active substance wets the inside of the wall of the candle 34. In order to achieve as steady a delivery of the active substance as possible over the entire period of use there must be a sufficiently large supply of active substance on the whole of the inside surface of the candle. In contrast to the arrangement shown in FIGS. 1 and 2, the direct wetting of the inside surface of the candle in the case of FIG. 4 decreases during use.

It is advantageous, however, to maintain the whole of the surface wet by capillary action. For this purpose on the inside of the candle 34, for example, there is provided a thin absorbent layer of paper 38. An eye 39 is provided at the top of the candle for suspending it during use.

In another arrangement illustrated in FIGS. 5 and 6 active substance 54 is stored within a diffusion candle 52, the latter in this case being surrounded by an outer skin or jacket 50 of impermeable material, in order to prevent escape of the active substance during storage thereof. The outer skin 50 consists of a metal or plastic foil, for example, and can be ripped open by means of a tearing strip 56. After it has been ripped open, the lower part 57 thereof can be drawn off, to expose the diffusion candle 52. An eye 58 is provided at the upper end of the candle for suspending it during use. The outer skin 50 fits around the diffusion candle 52 as tightly as possible so that there is no gap between them into which the active substance can leak during storage. Within the diffusion candle 52, there is as in the previous embodiment a thin absorbent layer 60 in order to ensure that the inside of the diffusion candle is completely wetted during use.

The enclosure of the diffusion candle 52, during storgrate outwardly, it is advantageous in this case to add ble foil, for example metal foil, wound helically around the same. For use of the candle, this strip may then be unwound by a variable amount in order to expose a desired proportion of the candle 52.

A particularly uniform diffusion which is of little dependence on temperature, moisture content of the atmosphere and other conditions can be obtained from a diffusion candle according to the invention when the material employed for the membrane is a plastic, which contains a plasticizer in which the active substance is soluble. The velocity of the diffusion may depend on the nature and amount of the plasticizer present in the plastic material. Since, when the active substance is conveyed through the membrane, part of the plasticizer may migrate outwardly, it is advantageous in this case to add plasticizer to the active substance inside the container in order to keep the amount of plasticizer contained in the diffusion wall constant.

It has been found that, by adding plasticizers and, if required, stabilizers to the active substance to be diffused, the steady diffusion thereof can be extended for longer periods. In the case of a membrane consisting of PVC, it is possible to employ usual plasticizers suitable for PVC, dioctylphthalate being particularly successful.

By adding plasticizers in amounts of preferably 10–20% of the weight of the active substance, the diffusion of active substance can be rendered more uniform. A further step forward in obtaining a steady rate of diffusion extending over relatively long periods of time is achieved by adding stabilizers of the type of the acid-binding organic compounds containing epoxy and ethylene imide groups, such as epichlorhydrin, glycide esters of phenols, mono- and polyhydric alcohols, and also ethylene imides of organic carboxylic acids such as benzoic acid, or carbonic monoalkyl esters, for example ethyl-carbonic acid ethylene imide.

The total amount of plasticizers and/or stabilizers to be added varies between 5 and 50% referred to the total charge of the delivery container, preferably between 10 and 20%. Owing to the addition of the plasticizers and/or stabilizers, both the phosphoric acid ester, for example the DDVP, in the PVC tube is stabilized and also the PVC tube itself which, without adding plasticizer and/or stabilizer, becomes hard and impermeable with time, whereas with the said additions it remains soft and permeable.

geous in the control of malaria-transmitting mosquitoes, it being possible to accommodate a plurality of emission devices in a common protective sleeve.

| Test No. | Composition | Amount Given Off After— | | | | | | |
|---|---|---|---|---|---|---|---|---|
| | | 3 days | 10 days | 20 days | 30 days | 40 days | 50 days | 60 days |
| 1 | 100% DDVP | 100 | 100 | 60 | 40 | 17 | 8 | |
| 2 | 80% DDVP / 20% Diocytlphthalate | 100 | 100 | 80 | 60 | 40 | | |
| 3 | 80% DDVP / 20% Butyleneglycoldiglycide ether | 100 | 100 | 80 | 60 | 40 | | |
| 4 | 80% DDVP / 10% Dioctylphthalate / 10% Butyleneglycoldiglycide ether | 100 | 100 | 80 | 70 | 60 | 40 | 25 |
| 5 | 70% DDVP / 10% Dioctylphthalate / 20% Butyleneglycoldiglycide ether | 100 | 100 | 100 | 90 | 80 | 60 | 50 |
| 5a (with sleeve) | As 5 | 100 | 100 | 100 | 90 | 90 | 80 | 80 |

Example 1

A device of the type shown in FIGS. 1 and 2 consists of a supply container for active substance made of low pressure polyethylene and having a wall thickness of 1 mm. The volume of the charge of active substance was 5 cc. A tube 4 cm. long and having an external diameter of 1 cm. and a wall thickness of 2 mm. was used as the membrane, the tube being made of polyvinylchloride with a content of dioctylphthalate of 40% by weight.

The container was used for emitting DDVP to the surrounding air.

When the device was suspended in a room at a temperature of 25° C. with a relative moisture content of 50%, the daily amount of active substance emitted was 100 mg. and remained practically constant in the course of 20 days.

Example 2

Six containers of the type shown in FIGS. 1 and 2 consisting of high-pressure polyethylene and having a capacity of 15 ml. were filled with various liquids in accordance with the following table and, after a PVC tube with an internal diameter of 1 cm., a wall thickness of 2 mm. and a length of 10 cm. had been mounted thereon, were suspended with the tube directly downwardly. Specimen No. 5a was moreover suspended in a perforated protective sleeve 20 cm. in length and 3 cm. in diameter. In the first 2 days after the commencement of the test, diffusion began and had reached a constant value on the third day. In the table, this amount is shown as 100% and the progress of diffusion and evaporation at a constant temperature of 30° C. is recorded as a percentage of the amount given off after three days.

The table shows that the addition of the plasticizer and stabilizer produces a considerable improvement in the constancy of the rate of diffusion of the DDVP. This effect becomes particularly clear when the devices are not suspended freely in the light, but in a protective sleeve consisting of perforated material. Such a method of suspension in a perforated protective sleeve is advantageous in the control of malaria-transmitting mosquitoes, it being possible to accommodate a plurality of emission devices in a common protective sleeve.

What is claimed is:
1. A device for the continuous and even emission of biologically active substances consisting of
   (a) a plastic supply vessel having polyethylene walls impermeable for the liquid containing the active substance, the neck of which vessel is closed before use by a stopper removable by squeezing the sides of the supply vessel together and so expelling the stopper from the neck into the diffusion candle set forth below under (b), and
   (b) a plastic diffusion candle drawn over the neck of the supply vessel and consisting of polyvinyl chloride, which diffusion candle is in the form of a tube closed on one end, and the walls of which are of a homogenous structure that permits diffusion of a small steady amount of the active substance.

2. A device as claimed in claim 1, wherein the walls of the supply vessel have thickness of 1 mm. and the walls of the diffusion candle have a thickness of 2 mm.

References Cited in the file of this patent
UNITED STATES PATENTS

| | | |
|---|---|---|
| 467,575 | Force | Jan. 26, 1892 |
| 514,422 | Kellogg | Feb. 6, 1894 |
| 1,248,859 | Hitchcock | Dec. 4, 1917 |
| 1,341,525 | Vericel | May 25, 1920 |
| 1,506,659 | O'Donnell | Aug. 26, 1924 |
| 1,944,375 | Schneider | Jan. 23, 1934 |
| 1,991,938 | Houghton | Feb. 19, 1935 |
| 2,058,571 | Crocker | Oct. 27, 1936 |
| 2,238,935 | Gumaer | Apr. 22, 1941 |
| 2,512,996 | Bixler | June 27, 1950 |
| 2,567,905 | Field | Sept. 11, 1951 |
| 2,717,174 | Casanovas | Sept. 6, 1955 |
| 2,743,285 | Wilkes et al. | Apr. 24, 1956 |
| 2,861,965 | Roncoroni | Nov. 25, 1958 |
| 2,991,517 | Bundy | July 11, 1961 |

FOREIGN PATENTS

| | | |
|---|---|---|
| 142 | Great Britain | Jan. 2, 1914 |
| 339,757 | Germany | Aug. 5, 1921 |

OTHER REFERENCES

Ihndris et al.: Journal of Economic Entomology, vol. 51, (1958), pages 638 and 639.